US010886032B2

(12) United States Patent
Cook et al.

(10) Patent No.: US 10,886,032 B2
(45) Date of Patent: Jan. 5, 2021

(54) NUCLEAR FUEL STORAGE POOL INCLUDING AQUEOUS SOLUTION OF POLYHEDRAL BORON HYDRIDE ANIONS

(71) Applicant: CERADYNE, INC., Costa Mesa, CA (US)

(72) Inventors: Kevin S. Cook, Carl Junction, MO (US); Beth D. Bosley, Valencia, PA (US)

(73) Assignee: 3M Innovative Properties Company, St. Paul, MN (US)

(*) Notice: Subject to any disclaimer, the term of this patent is extended or adjusted under 35 U.S.C. 154(b) by 350 days.

(21) Appl. No.: 15/306,324

(22) PCT Filed: Apr. 23, 2015

(86) PCT No.: PCT/US2015/027305
§ 371 (c)(1),
(2) Date: Oct. 24, 2016

(87) PCT Pub. No.: WO2015/164610
PCT Pub. Date: Oct. 29, 2015

(65) Prior Publication Data
US 2017/0047133 A1 Feb. 16, 2017

Related U.S. Application Data

(60) Provisional application No. 61/984,538, filed on Apr. 25, 2014.

(51) Int. Cl.
G21C 19/07 (2006.01)
G21C 19/40 (2006.01)

(52) U.S. Cl.
CPC ............ *G21C 19/07* (2013.01); *G21C 19/40* (2013.01)

(58) Field of Classification Search
CPC ........... G21C 19/07; G21C 19/40; G21C 7/24
USPC ................................. 376/272, 327, 338, 339
See application file for complete search history.

(56) References Cited

U.S. PATENT DOCUMENTS

| | | | |
|---|---|---|---|
| 3,089,835 A | 5/1963 | Schulten et al. | |
| 3,148,938 A | 9/1964 | Knoth | |
| 3,169,045 A | 2/1965 | Miller | |
| 3,328,134 A | 6/1967 | Miller | |
| 3,355,261 A | 11/1967 | Miller | |
| 3,390,966 A | 7/1968 | Knoth | |
| 3,498,879 A | 3/1970 | Dastur | |
| 3,961,017 A | 6/1976 | Hough | |
| 4,115,520 A | 9/1978 | Dunks | |
| 4,115,521 A | 9/1978 | Dunks | |
| 4,150,057 A | 4/1979 | Sayles | |
| 4,153,672 A | 5/1979 | Dunks | |
| 4,391,993 A | 7/1983 | Sayles | |
| 4,495,140 A | 1/1985 | Kochka | |
| 4,640,827 A | 2/1987 | Salentine | |
| 4,781,883 A * | 11/1988 | Daugherty | G21C 19/40 376/272 |
| 4,844,856 A | 7/1989 | Cohen | |
| 4,968,478 A | 11/1990 | Burda | |
| 5,045,275 A | 9/1991 | Abdel-Khalik | |
| 5,245,641 A * | 9/1993 | Machado | G21C 19/07 376/272 |
| 5,443,732 A | 8/1995 | Lahoda | |
| 5,503,812 A | 4/1996 | Kirishima | |
| 6,203,624 B1 | 3/2001 | Bargues et al. | |
| 6,525,224 B1 * | 2/2003 | Spielvogel | A61K 41/0095 568/1 |
| 7,161,040 B2 | 1/2007 | Franken | |
| 7,524,477 B2 * | 4/2009 | Spielvogel | C01B 6/10 423/283 |
| 7,563,934 B2 * | 7/2009 | Banavali | C01B 6/21 556/8 |
| 7,641,879 B2 | 1/2010 | Spielvogel | |
| 7,718,154 B2 | 5/2010 | Ivanov | |
| 7,803,288 B2 | 9/2010 | Hayashi et al. | |

(Continued)

FOREIGN PATENT DOCUMENTS

DE 19748222 7/1999
JP 63-61191 3/1988

(Continued)

OTHER PUBLICATIONS

Paskevicius, "First-order Phase Transition in the Li2B12H12 System", Phys. Chem. Chem. Phys. 2013, 15, 15825-15828. (Year: 2013).*
Kaczmarczyk, "Oxidative Degradation of Polyhedral Boranes", Journal of the American Chemical Society 87, No. 6 (1965) 1413. (Year: 1965).*
Dunks, "A One-Step Synthesis of $B_{11}H_{14}$-from $NaBH_4$," Inorganic Chemistry, 1978, vol. 17, No. 6, pp. 1514-1516.
Franken, "Preparation of [closo-$CB_{11}H_{12}$] by Dichlorocarbene Insertion Into [nido-$B_{11}H_{14}$]", Collection of Czechoslovak Chemical Communications, 2001, vol. 66, pp. 1238-1249.

(Continued)

*Primary Examiner* — Jack W Keith
*Assistant Examiner* — Daniel Wasil
(74) *Attorney, Agent, or Firm* — Kathleen B. Gross

(57) ABSTRACT

A method of storing nuclear fuel is described. In some cases, the method includes submerging at least a portion of a nuclear fuel rod in a storage pool containing an aqueous solution including at least one of polyhedral boron hydride anions or carborane anions. In some cases, the method includes adding a salt having a polyhedral boron hydride anion or carborane anion to a storage pool containing water and at least a portion of a nuclear fuel rod submerged in it. The method may include both of these. A storage pool is also described. The storage pool includes an aqueous solution having at least one of polyhedral boron hydride anions or carborane anions with at least a portion of a nuclear fuel rod submerged in the aqueous solution. A method of servicing a nuclear reactor core is also described.

20 Claims, No Drawings

(56) References Cited

U.S. PATENT DOCUMENTS

| | | | |
|---|---|---|---|
| 7,955,580 | B2 | 6/2011 | Spielvogel |
| 2006/0286020 | A1 | 12/2006 | Ivanov |
| 2010/0239062 | A1 | 9/2010 | Yeon |
| 2010/0246746 | A1 | 9/2010 | Connor |
| 2011/0110481 | A1 | 5/2011 | Greenspan |
| 2011/0110482 | A1 | 5/2011 | Greenspan |
| 2011/0110483 | A1 | 5/2011 | Greenspan |
| 2012/0043483 | A1* | 2/2012 | Bowen .................... G21F 1/02 250/516.1 |
| 2012/0043502 | A1 | 2/2012 | Eastwood |
| 2012/0243651 | A1 | 9/2012 | Malloy |
| 2013/0136223 | A1* | 5/2013 | Yeon .................... G21C 19/40 376/219 |
| 2014/0270040 | A1* | 9/2014 | Lam .................... G21C 19/07 376/254 |
| 2016/0019989 | A1 | 1/2016 | Cook |

FOREIGN PATENT DOCUMENTS

| | | | |
|---|---|---|---|
| JP | 6-194493 | | 7/1994 |
| JP | H09-080192 | | 3/1997 |
| JP | 2002-022888 | | 1/2002 |
| JP | 2003-050294 | | 2/2003 |
| JP | 2013-205137 | | 10/2013 |
| JP | 2013205137 | A * | 10/2013 |
| JP | 2014-48190 | | 3/2014 |

OTHER PUBLICATIONS

Grimes, "Boron Clusters Come of Age," Journal of Chemical Education, vol. 81, No. 5, May 31, 2004, pp. 657-672.

Hill, "From Sodium Borohydride to 1,2-Dicarba-closo-Dodecaboranes", Boron Chemistry-4, Pergamon Press, 1979, pp. 33-39.

Jelinek, "Chemistry of Compounds With the L-Carba-Closo-Dodecaborane(12) Framework", Collection of Czechoslovak Chemical Communications, 1986, vol. 51, pp. 819-829.

Jiang, "Experimental Research on the Gravity-Driven Boron Injection System for a 200 MW Nuclear Heating Reactor," Annals of Nuclear Energy, 2001, vol. 28, pp. 251-263.

Knoth, "1-$B_9H_9CH$- and $B_{11}H_{11}CH$-," Journal of the American Chemical Society, Mar. 1, 1967, vol. 89, No. 5, pp. 1274-1275.

Knoth, "C-Amminecarbaundecaborane(12) Derivatives and Cesium Tridecahydro-Carbaundecaborate(1-)," Inorganic Syntheses 1968, vol. 11, pp. 33-41.

Makhlouf, "Practical Synthesis for Decahydrocaborates," Inorganic Chemistry, Jun. 1967, vol. 6, No. 6, pp. 1196-1198.

Mongeot, "$(Et_4N)_2B_{10}H_{10}$ et $(Et_4N)_2B_{12}H_{12}$; synthesis de $Et_4$, $NBH_4$, separation et purification," Bulletin De La Societe Chimique De France, 1986, No. 3, pp. 385-389.

Reed, "Carborane acids. New "strong yet gentle" acids for organic and inorganic Chemistry," Chemical Communications, Feb. 25, 2005, pp. 1669-1677.

Reed, "Carboranes: A New Class of Weakly Coordinating Anions from Strong Electrophiles, Oxidants, and Superacids," Accounts of Chemical Research, Feb. 24, 1998, vol. 31, No. 3, pp. 133-139.

Strauss, "The Search for Larger and More Weakly Coordinating Anions," Chemical Reviews, 1993, vol. 93, No. 3, pp. 927-942.

Volkov, "Preparation of Dodecahydro-closododecaborates(2-) by the Reaction of Alkali Metal Tetrahydroborates with Triethylamine-Borane," Russian Journal of Inorganic Chemistry, 1979, vol. 24, No. 10, pp. 1571-1572.

Technology Description, Boron Specialties LLC, Control No. 0670-4625, concept paper for an application for funding from Advanced Research Projects Agency-Energy, submitted by the inventors more than one year before Apr. 25, 2014, 4 pages.

International Search Report for PCT International Application No. PCT/US2015/027305, dated Aug. 13, 2015, 3 pages.

* cited by examiner

NUCLEAR FUEL STORAGE POOL INCLUDING AQUEOUS SOLUTION OF POLYHEDRAL BORON HYDRIDE ANIONS

CROSS-REFERENCE TO RELATED APPLICATION

This application is a national stage filing under 35 U.S.C. 371 of PCT/US2015/027305, filed Apr. 23, 2015, which claims priority to U.S. Provisional Application No. 61/984,538, filed Apr. 25, 2014, the disclosure of which is incorporated by reference in its entirety herein.

BACKGROUND

Generally, in nuclear power generation, thermal energy is generated by the chain fission of a fissionable material (e.g., thorium, uranium, and plutonium), and power necessary for electric power generation is derived from the thermal energy. The fissionable material is typically prepared in the form of a sintered body and contained in a nuclear fuel rod. Nuclear fuel rods are arranged in a bundle to form a nuclear fuel assembly. In a nuclear reactor core, a control rod and a moderator are generally used to control the number and speed of extra neutrons and prevent a chain reaction (reactivity: >1) of fissionable materials. The moderator can include heavy water ($D_2O$), light water ($H_2O$), graphite, and beryllium, for example. Nuclear reactors may be classified into types depending on the nature of the moderator. For example, light-water nuclear reactors (LWR) include pressurized water reactors (PWR) and boiling water reactors (BWR). Other types of nuclear reactors include heavy-water nuclear reactor (HWR), which include a heavy water moderator, and high-temperature gas-cooled reactors (HTGR).

Periodically, a portion of the nuclear fuel rods are removed from the reactor core and replaced with new fuel rods. The spent fuel rods are typically stored in racks for several years (e.g., for ten to twenty years) in pools of water deep enough for the water to provide adequate radiation shielding. The water is cooled to control the heat generated by the spent fuel rods. Solid neutron-absorbing materials including $^{10}B$ atoms (e.g., boron carbide in a metal or polymer matrix) are typically used in the storage racks to absorb neutrons and prevent criticality in the storage pools. Soluble boron from boric acid may also be added to the pool water for this purpose.

SUMMARY

The use of boric acid in storage pools for nuclear fuel rods poses some problems. Boric acid can cause corrosion, for example, of racking materials or any exposed fuel cladding. Furthermore, the solubility of boric acid in water is typically reported to be about 4.7 grams per 100 grams of solution at 20° C. The low concentration of soluble boron in a storage pool can limit its utility to prevent criticality and/or limit its utility during emergency situations.

An aqueous solution including at least one of polyhedral boron hydride anions or carborane anions is provided in the methods and storage pool according to the present disclosure. The polyhedral boron hydride anions or carborane anions absorb neutrons to prevent uncontrolled nuclear fission reactions. The polyhedral boron hydride anions or carborane anions, which in some embodiments comprise at least one of $B_{10}H_{10}^{2-}$, $B_{11}H_{14}^-$, $CB_{11}H_{12}^-$, or $B_{12}H_{12}^{2-}$, have a larger weight percent of boron than boric acid, and at least some of the salts from which they dissociate are more soluble in water than boric acid. As a result, typically, the aqueous solutions comprising at least one of polyhedral boron hydride anions or carborane anions have greater boron availability than boric acid solutions, which can enhance the solution's ability to prevent criticality. Also, the greater boron availability in these solutions may make them useful for movement or storage of active fuel rods during emergency situations or unexpected permanent plant shutdowns. The aqueous solution comprising at least one of polyhedral boron hydride anions or carborane anions is also expected to lead to less system corrosion than boric acid solutions.

In one aspect, the present disclosure provides a method of storing nuclear fuel outside of a nuclear reactor core. In some cases, the method includes submerging at least a portion of a nuclear fuel rod in a storage pool containing an aqueous solution including at least one of polyhedral boron hydride anions or carborane anions. In some cases, the method includes adding a salt having a polyhedral boron hydride anion or carborane anion to a storage pool containing water and at least a portion of a nuclear fuel rod submerged in it. In some cases, the method includes both of these. Adding the at least one salt provides an aqueous solution comprising at least one of polyhedral boron hydride anions or carborane anions. The nuclear fuel rod or portion of the nuclear fuel rod is generally outside of a nuclear reactor core.

In another aspect, the present disclosure provides a storage pool. The storage pool includes an aqueous solution comprising at least one of polyhedral boron hydride anions or carborane anions and at least a portion of a nuclear fuel rod. The nuclear fuel rod may be a used fuel rod (which may be a spent fuel rod) or a fresh fuel rod. The nuclear fuel rod or portion thereof may be stored in a rack. The storage pool may have at least 20 feet (6.1 meters) of the aqueous solution over the nuclear fuel rod or portion thereof.

In one aspect, the present disclosure provides a method of servicing a nuclear reactor. The method includes receiving at least one used fuel rod from a nuclear reactor core into a storage pool containing an aqueous solution including at least one of polyhedral boron hydride anions or carborane anions. The used fuel rod may be a spent fuel rod. In some cases, the method also includes receiving at least one fresh nuclear fuel rod into the storage pool.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "spent", "used", and "fresh" herein refer to various degrees of activity of nuclear fuel. "Spent" and "used" nuclear fuel have both been used in a nuclear reactor. "Spent" nuclear fuel has lower activity and may not be considered reusable while "used" nuclear fuel may be reusable. "Fresh" nuclear fuel has not been used in a reactor and has the highest activity.

The term "aqueous" refers to including water. The water may be $H_2O$ or $D_2O$.

The terms "storing" and "storage" are not limited to a certain period of time. Storage can refer to any period time nuclear fuel is present other than inside the reactor core for generating heat. Methods of storing can include storing for several hours, several days, several months, several years, or several decades.

All numerical ranges are inclusive of their endpoints and non-integral values between the endpoints unless otherwise stated (e.g., 1 to 5 includes 1, 1.5, 2, 2.75, 3, 3.80, 4, 5, etc.).

DETAILED DESCRIPTION

Aqueous solutions useful for practicing the present disclosure include at least one of polyhedral boron hydride anions or carborane anions. Polyhedral boron hydride anions comprise only boron and hydrogen atoms. Carborane anions comprise only carbon, boron, and hydrogen atoms.

In some embodiments, the anions are polyhedral boron hydride anions. In some embodiments, the polyhedral boron hydride anions comprise at least one of $B_{10}H_{10}^{2-}$, $B_{11}H_{14}^-$, or $B_{12}H_{12}^{2-}$. In some embodiments, the polyhedral boron hydride anions comprise at least one of $B_{10}H_{10}^{2-}$ or $B_{12}H_{12}^{2-}$. In some embodiments, the polyhedral boron hydride anions comprise $B_{10}H_{10}^{2-}$. In some embodiments, the polyhedral boron hydride anions comprise $B_{11}H_{14}^-$. In some embodiments, the polyhedral boron hydride anions comprise $B_{12}H_{12}^{2-}$. The polyhedral boron hydride anions are typically provided in the aqueous solution by dissolution of Group I salts, Group II salts, ammonium salts, or alkyl ammonium salts, wherein alkyl is ethyl or methyl. The alkyl ammonium salts may be monoalkyl-, dialkyl-, trialkyl-, or tetraalkylammonium salts. In some embodiments, the polyhedral boron hydride anions are provided in the aqueous solution by dissolution of Group I salts, ammonium salts, or tetraalkyl ammonium salts, in some embodiments, Group I salts. Examples of suitable salts include $Li_2B_{10}H_{10}$, $Na_2B_{10}H_{10}$, $K_2B_{10}H_{10}$, $(NH_4)_2B_{10}H_{10}$, $[(C_2H_5)_3NH]_2B_{10}H_{10}$, $LiB_{11}H_{14}$, $NaB_{11}H_{14}$, $KB_{11}H_{14}$, $NH_4B_{11}H_{14}$, $Li_2B_{12}H_{12}$, $Na_2B_{12}H_{12}$, $K_2B_{12}H_{12}$, and $(NH_4)_2B_{12}H_{12}$.

In some embodiments, the anions are carborane anions. In some embodiments, the carborane anions comprise $CB_{11}H_{12}^-$. The carborane anions are typically provided in the aqueous solution by dissolution of Group I salts, Group II salts, ammonium salts, or alkyl ammonium salts, wherein alkyl is ethyl or methyl. The alkyl ammonium salts may be monoalkyl-, dialkyl-, trialkyl-, or tetraalkylammonium salts. In some embodiments, the carborane anions are provided in the aqueous solution by dissolution of Group I salts, ammonium salts, or tetraalkyl ammonium salts, in some embodiments, Group I salts. Examples of suitable salts include $LiCB_{11}H_{12}$, $NaCB_{11}H_{12}$, $KCB_{11}H_{12}$, $NH_4CB_{11}H_{12}$.

The aqueous solutions useful for practicing the present disclosure can include combinations of any of the anions or salts described above in any of their embodiments. Also, the aqueous solutions useful for practicing the present disclosure typically are free of organic polymers.

Polyhedral boron hydride salts can be prepared by known methods. For example, methods of preparing $MB_{11}H_{14}$ salts from metal borohydride or $MB_3H_8$ starting materials can be found in U.S. Pat. Nos. 4,115,520; 4,115,521; and 4,153,672, each to Dunks et al.

Pyrolysis of tetraalkyl ammonium borohydride salts under a variety of conditions has been reported to provide salts of the $B_{10}H_{10}^{2-}$ anion. See, for example, (1) W. E. Hill et al, "Boron Chemistry 4." Pergamon Press, Oxford 1979, p 33; (2) Mongeot et al Bull. Soc. Chim. Fr. 385, 1986; and (3) U.S. Pat. Nos. 4,150,057 and 4,391,993, both issued to Sayles. The tetraalkylammonium borohydride starting materials ($R_4NBH_4$) can be prepared by contacting sodium borohydride with one or more molar equivalents of a tetralkylammonium salt (e.g., tetralkylammonium hydrogensulfate) in an aqueous or alcohol solution. By regulating the temperature (e.g., through the use of precise internal temperature readings, methods for cooling the reaction mixture, and particular ramp and isothermal profiles), pyrolysis of tetraalkylammonium borohydride salts can provide salts of the $B_{10}H_{10}^{2-}$ and/or $B_{12}H_{12}^{2-}$ anion in good yield as reported in U.S. Pat. No. 7,524,477 (Spielvogel et al.). For example, in some methods of preparing $B_{10}H_{10}^{2-}$, $B_9H_9^-$, $B_{11}H_{14}^-$, and/or $B_{12}H_{12}^{2-}$, the $R_4NBH_4$ is dissolved, suspended, or mixed with a solvent having a boiling point of at least about 100° C. and heated. Examples of useful solvents include $C_8$-$C_{18}$ alkanes or mixtures of $C_8$-$C_{18}$ alkanes, including n-dodecane and mixtures of n-decane and n-dodecane. In other methods of preparing $B_{10}H_{10}^{2-}$, $B_9H_9^-$, $B_{11}H_{14}^-$, and/or $B_{12}H_{12}^-$, a mixture of $R_4NBH_4$ and a trialkylamine borane adduct is pyrolyzed. A ratio of the borohydride to the trialkylamine borane is typically between about 1:3 to about 3:1, and this ratio can be 1:1. In these methods, pyrolysis at a temperature of about 185° C. typically provides a mixture of tetraalkylammonium $B_{101410}^{2-}$ and tetraalkylammonium $B_{12}H_{12}^{2-}$ salts in a ratio of about 1.4:1. Various cations for the polyhedral boron hydride salts can be provided, for example, by ion exchange methods.

Further methods for preparing $B_{12}H_{12}^{2-}$ salts are reported, for example, in U.S. Pat. No. 7,718,154 (Ivanov et al.), which describes reaction of a metal hydride with an alkyl borate in the presence of a Lewis base to produce a Lewis base-borane complex that is thermally decomposed to form the $B_{12}H_{12}^{2-}$ salt, and U.S. Pat. No. 7,563,934 (Banavali et al.), which describes reaction of a metal borohydride with $XBH_3$, where X is a substituted amine, a substituted phosphine, or tetrahydrofuran.

Syntheses of $CB_{11}H_{12}^-$ salts are also known. See, e.g., Knoth, W. H., Journal of the American Chemical Society, 1967, vol. 89, page 1274; Jelinek, T. et al., Collection of Czechoslovak Chemical Communications, 1986, vol. 51, page 819; and Franken, A., et al., Collection of Czechoslovak Chemical Communications, 2001, vol. 66, pages 1238-1249.

Of the two naturally occurring isotopes of boron ($^{11}B$ and $^{10}B$), $^{10}B$ is a better neutron absorber with a thermal neutron absorption cross section of approximately 3800 barns (3.8×$10^{-24}$ $m^2$). Accordingly, in some embodiments, the polyhedral boron hydride anions, including in any of the aforementioned salts, are enriched in $^{10}B$. A variety of procedures are available for the synthesis of $^{10}B$ enriched polyhedral boron hydride salts. In general, the syntheses begin with $^{10}B$ enriched boric acid, which can be converted to borohydride salts. Enriched borohydrides can be used with any of the methods described above, for example, to provide salts enriched in $^{10}B$. In some embodiments, at least one of the tetraalkylammonium borohydride salts or the trialkylamine borane adduct included in a pyrolysis mixture described above is enriched in $^{10}B$. Isotopically enriched $B_{11}H_{14}^-$ salts from isotopically enriched boric acid are described in U.S. Pat. No. 7,641,879 (Spielvogel).

At least some of the salts (e.g., $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_{14}$, $NH_4B_{11}H_{14}$, $Li_2B_{12}H_{12}$, $Na_2B_{12}H_{12}$, $K_2B_{12}H_{12}$, and $(NH_4)_2B_{12}H_{12}$) including $^{10}B$ enriched salts are commercially available from Boron Specialties LLC, Valencia, Pa.

In some embodiments, the polyhedral boron hydride anions or carborane anions are provided in the aqueous solution by dissolution of $Li_2B_{10}H_{10}$, $LiB_{11}H_{14}$, $LiCB_{11}H_{12}$, or $Li_2B_{12}H_{12}$. In some embodiments, the polyhedral boron hydride salt is $Li_2B_{10}H_{10}$. In some embodiments, the polyhedral boron hydride salt is $Li_2B_{12}H_{12}$. In some embodiments, the polyhedral boron hydride salt is $LiB_{11}H_{14}$. In some embodiments, the carborane salt is $LiCB_{11}H_{12}$. Because of the low atomic mass of lithium, such salts may have the highest weight percentage of boron in comparison to other polyhedral boron hydride salts or carborane salts. Furthermore, as discussed in greater detail below, the lithium salts may have some of the highest water solubilities of the polyhedral boron hydride salts. $^7Li$ is the most common lithium isotope accounting for 92.5 percent of the atoms. However, $^7Li$ is neutron transparent, and it may be useful in some embodiments for any one of $Li_2B_{10}H_{10}$, $LiB_{11}H_{14}$, $LiCB_{11}H_{12}$, or $Li_2B_{12}H_{12}$ to be enriched in $^7Li$. The enrichment in $^7Li$ can be carried out by treating $(Et_4N)_2B_{10}H_{10}$, $Et_4NB_{11}H_{14}$, $(Et_4N)_2B_{12}H_{12}$, or a carborane salt prepared according to the methods described above, with commercially available $^7LiOH$ in water.

Polyhedral boron hydride and carborane salts are useful in the method and storage pool disclosed herein, for example, because of their generally high boron content. While boric acid is only 17.5% by weight boron, typically, polyhedral boron hydride and carborane salts useful for practicing the present disclosure have at least 25 percent by weight boron, based on the total molecular weight of the salt. For example, $Cs_2B_{10}H_{10}$ is 28% by weight boron. In other examples, $Li_2B_{10}H_{10}$, $Na_2B_{10}H_{10}$, and $(NH_4)_2B_{10}H_{10}$ are 81.9%, 65.9%, and 70.1% by weight boron, respectively. In further examples, $Li_2B_{12}H_{12}$, $Na_2B_{12}H_{12}$, and $(NH_4)_2B_{12}H_{12}$ are 83.3%, 69.1%, and 72.9% by weight boron, respectively. In yet other examples, $LiCB_{11}H_{12}$, $NaCB_{11}H_{12}$, and $KCB_{11}H_{12}$ are 79.3%, 71.6%, and 65.3% by weight boron, respectively. In some embodiments, the polyhedral boron hydride salts or carborane salts have at least 30, 35, 40, 45, 50, 55, 60, or 65 percent by weight boron, based on the total molecular weight of the salt.

Polyhedral boron hydride salts are also useful in the method and storage pool disclosed herein, for example, because of their high solubilities in water. While boric acid is typically reported to have a solubility in water of only about 4.7 grams per 100 grams of solution at 20° C., typically, polyhedral boron hydride salts useful for practicing the present disclosure have solubilities of at least 15 grams per 100 grams of solution at 20° C. or at least three times the water solubility of boric acid. In some embodiments, the polyhedral boron hydride salts useful for practicing the present disclosure have water solubilities of at least 20, 25, 30, 35, 40, 45, or at least 50 grams per 100 grams of solution at 20° C. Certain carborane salts are also expected to have useful water solubilities. $CB_{11}H_{12}^-$, for example, is a very weakly coordinating anion. The water solubilities for many different salts and the method for determining these solubilities are reported in the Examples, below.

The storage pool according to the present disclosure is useful, for example, for storing nuclear fuel rods outside of a nuclear reactor core. The storage pool is generally located at the reactor site where electricity is generated and can contain submerged used fuel rods, removed after use in a reactor core and which may be spent fuel rods, submerged fresh fuel rods yet to be used in the nuclear reactor core, other submerged reactor components, or any combination thereof. The aqueous solution including at least one of polyhedral boron hydride anions or carborane anions, which are neutron absorbers, can prevent uncontrolled nuclear fission reactions in the storage pool. The aqueous solution in the storage pool also serves as a radiation shield from the radioactive fuel rods and as a coolant to absorb the heat of the radioactively decaying isotopes in the fuel. The aqueous solution useful for practicing the present disclosure may include dissolved salts according to any of the embodiments described above at any useful concentration up to the solubility limit of the salt(s). In some embodiments, the polyhedral boron hydride salt or carborane salt is present at a concentration of at least 15, 20, 25, 30, 35, 40, 45, or at least 50 grams per 100 grams of the aqueous solution.

The storage pool may have at least about 20 feet (6.1 meters) of aqueous solution over the submerged fuel rods to provide a safety margin and allow fuel assembly manipulation without special shielding protecting the operators. Although other depths of at least 20 feet (6.1 meters) are possible, in some embodiments, the storage pool is at least about 30 or 40 feet (9.1 or 12.2 meters) in depth. In some embodiments, the storage pool is made of concrete. It should be understood that the storage pool is a collection of standing water and is not itself a nuclear reactor core.

In some embodiments, the storage pool includes storage racks designed to hold fuel rods or fuel assemblies from the nuclear reactor core. The storage racks may include boron carbide in a metal or polymer matrix. The storage racks may be located in approximately the bottom 14 feet (4.3 meters) of the pool. The fuel rods may be stored in racks in a configuration similar to their configuration when they were in use in a nuclear reactor core although other configurations may be useful. The method and storage pool according to the present disclosure are also useful when the fuel rods are not stored in racks. For example, after a natural disaster or accident, fuel rods may be disordered at the bottom of the pool. At least some of the fuel rods may be crushed or broken or may have lost a portion of their cladding.

In the method of storing nuclear fuel outside of a nuclear reactor core disclosed herein, dissolved salts in any of their embodiments described above may be present in the storage pool before any nuclear fuel rod or portion thereof is submerged in it. Alternatively or additionally, at least one polyhedral boron hydride salt or carborane salt can be added to a storage pool of water having at least a portion of a nuclear fuel rod already submerged in it. Adding the polyhedral boron hydride salt or carborane salt provides the aqueous solution of at least one of polyhedral boron hydride anions or carborane anions. Adding the polyhedral boron hydride salt or carborane salt to existing pools may be useful after a natural disaster, nuclear emergency, or other situations presenting the threat of criticality (e.g., additional nuclear fuel, either spent or fresh, needs to be added to the pool).

The present disclosure also provides a method of servicing a nuclear reactor that includes receiving at least one used fuel rod from a nuclear reactor core into a storage pool comprising an aqueous solution comprising at least one of polyhedral boron hydride anions or carborane anions. The servicing can be part of a shutdown or refueling operation, for example. In some cases, used fuel assemblies are racked and moved from the reactor core to the storage pool along the bottom of water canals. In embodiments in which the nuclear reactor is refueled, the used fuel rod is typically spent, and the method can also include receiving at least one fresh nuclear fuel rod into the storage pool. However, the fresh fuel and the spent fuel need not be in the same storage pool. Typically when the nuclear reactor core is refueled, the fresh fuel replaces a portion of the spent fuel in the reactor core and the spent fuel from the core is stored in the spent fuel storage pool. Fresh fuel can be delivered from a fresh fuel transportation cask into a fresh fuel pool, from which it is transferred to the nuclear reactor core.

Certain characteristics of boric acid limit its utility in a spent fuel pool and/or fresh fuel pool. As described above, the solubility of boric acid in water is typically reported to be about 4.7 grams per 100 grams of solution at 20° C. The low concentration of soluble boron in a storage pool can limit its utility to prevent criticality when a large amount of fuel is present. Also, boric acid corrosion due to deposits can compromise the integrity of the racks and related systems. Also, the use of boric acid provides a slightly acidic pH, which can lead to corrosion of the fuel rod cladding. To bring the pH to acceptable levels, $^7$LiOH can be added to the water. However, the presence of too much LiOH can also lead to corrosion of nuclear fuel rod cladding. To further protect the cladding from corrosion, depleted zinc oxide, which interacts with the fuel cladding material, can be added. Due to increased solubility of the polyhedral boron hydride salts and certain polyhedral carborane salts, higher concentrations of soluble boron can be present in storage pools than when boric acid is used, providing better control over fission reactions and allowing for the presence of higher amounts of fuel. Also, because of this increased solubility, the polyhedral boron hydride salts and certain polyhedral carborane salts will not be as prone to deposition, and if deposits do occur they are not expected to have the same corrosiveness. The polyhedral boron hydride and carborane salts are pH neutral, which may reduce or eliminate the need for the expensive LiOH and depleted zinc oxide in the methods and storage pool according to the present disclosure.

Furthermore, polyhedral boron hydride and carborane anions are typically thermally stable and non-toxic. The cage structure of polyhedral boron hydride and carborane anions renders them highly chemically stable, which allows for long term storage. The aqueous solutions containing these salts are then ready to use when needed. Also, the use of polyhedral boron hydride salts in aqueous solutions will not introduce any additional atoms or subsequent decay species to the general water chemistry that are conventionally not present.

The fuel rods that can be stored or received according to the methods disclosed herein and/or present in the storage pool of the present disclosure can be from any type of nuclear reactor core. In some embodiments, the nuclear reactor core is a component of a light water reactor, a boiling water reactor, a pressurized water reactor, a small modular reactor, or a heavy water reactor. In some embodiments, the nuclear reactor core is a component of a light water reactor, which may be a boiling water reactor or a pressurized water reactor.

In some embodiments, the fuel rods that can be stored or received according to the methods disclosed herein and/or present in the storage pool of the present disclosure are from a light water reactor. In a light water reactor, the primary coolant is $H_2O$, which flows through the reactor core to extract heat to generate steam or for some other useful purpose. For electrical power generation, the steam is used to drive a generator turbine. In thermal nuclear reactors, the primary coolant water also serves as a neutron moderator that thermalizes neutrons, which enhances reactivity of the fissionable material. Various reactivity control mechanisms, such as mechanically operated control rods and chemical treatment of the primary coolant with a soluble neutron poison are employed to regulate the reactivity and resultant heat generation.

In some embodiments, the fuel rods that can be stored or received according to the methods disclosed herein and/or present in the storage pool of the present disclosure are from a boiling water reactor (BWR). A BWR is a type of light water reactor, described above, in which the primary coolant water boils to generate the steam. The primary coolant water is typically maintained in a reactor pressure vessel that also contains the reactor core.

In some embodiments, the fuel rods that can be stored or received according to the methods disclosed herein and/or present in the storage pool of the present disclosure are from a pressurized water reactor (PWR). A PWR is a type of light water reactor, described above, with the primary coolant water maintained in a superheated state in a sealed pressure vessel that also contains the reactor core. This hot water, which does not boil, then exchanges heat with a secondary, lower pressure water system, which turns to steam and drives the turbine. In the PWR, both pressure and temperature of the primary coolant water are controlled. In some embodiments, the fuel rods that can be stored according to the method and/or in the storage pool of the present disclosure are from a heavy water reactor (HWR). A HWR operates like a PWR, but the primary cooling water is $D_2O$ instead of $H_2O$.

In some embodiments, the fuel rods that can be stored or received according to the methods disclosed herein and/or present in the storage pool of the present disclosure are from a small modular reactor. Such reactors typically have an electricity output of less than 500 megawatts (MW). Modular reactors are designed to be manufactured and assembled at a central factory location and then sent to their new location for installation. The small modular reactors may be light water cooled or heavy water cooled and may be boiling water reactors or pressurized water reactors.

Some Embodiments of the Disclosure

In a first embodiment, the present disclosure provides a method of storing nuclear fuel outside of a nuclear reactor core, the method comprising at least one of:

submerging at least a portion of a nuclear fuel rod in a storage pool comprising an aqueous solution comprising at least one of polyhedral boron hydride anions or carborane anions; or adding a salt comprising a polyhedral boron hydride anion or carborane anion to a storage pool comprising water and at least a portion of a nuclear fuel rod submerged therein, wherein adding the salt provides an aqueous solution comprising at least one of polyhedral boron hydride anions or carborane anions.

In a second embodiment, the present disclosure provides the method of the first embodiment, wherein the method comprises submerging at least a portion of a nuclear fuel rod in a pool comprising an aqueous solution comprising at least one of polyhedral boron hydride anions or carborane anions.

In a third embodiment, the present disclosure provides the method of the first embodiment, wherein the method comprises adding at least one salt comprising a polyhedral boron hydride anion or carborane anion to a pool comprising water and at least a portion of a nuclear fuel rod submerged therein.

In a fourth embodiment, the present disclosure provides a storage pool comprising:

an aqueous solution comprising at least one of polyhedral boron hydride anions or carborane anions; and at least a portion of a nuclear fuel rod submerged in the aqueous solution.

In a fifth embodiment, the present disclosure provides the method or storage pool of any one of the first to fourth embodiments, wherein the nuclear fuel rod or the portion thereof is a spent fuel rod or a portion thereof.

In a sixth embodiment, the present disclosure provides the method or storage pool of any one of the first to fourth embodiments, wherein the nuclear fuel rod or the portion thereof is a fresh fuel rod or a portion thereof.

In a seventh embodiment, the present disclosure provides the method or storage pool of any one of the first to fourth embodiments, wherein the nuclear fuel rod or the portion thereof is a used fuel rod or a portion thereof.

In an eighth embodiment, the present disclosure provides the method or storage pool of any one of the first to seventh embodiments, wherein the at least one of polyhedral boron hydride anions or carborane anions are enriched in $^{10}$B.

In a ninth embodiment, the present disclosure provides the method or storage pool of any one of the first to eighth embodiments, wherein the at least one of polyhedral boron hydride anions or carborane anions are provided by a dissolved Group I salt or ammonium salt.

In a tenth embodiment, the present disclosure provides the method or storage pool of the ninth embodiment, wherein the Group I salt or ammonium salt has at least 25 percent by weight boron.

In an eleventh embodiment, the present disclosure provides the method or storage pool of the ninth or tenth embodiment, wherein the Group I salt or ammonium salt has a water solubility of at least 15 grams per 100 grams of solution at 20° C.

In a twelfth embodiment, the present disclosure provides the method or storage pool of any one of the first to eleventh embodiments, wherein the anions are polyhedral boron hydride anions comprising at least one of $B_{10}H_{10}^{2-}$, $B_{11}H_{14}^{-}$, or $B_{12}H_{12}^{2-}$.

In a thirteenth embodiment, the present disclosure provides the method or storage pool of the twelfth embodiment, wherein the polyhedral boron hydride anions comprise at least one of $B_{10}H_{10}^{2-}$ or $B_{12}H_{12}^{-}$.

In a fourteenth embodiment, the present disclosure provides the method or storage pool of the thirteenth embodiment, wherein the polyhedral boron hydride anions are from a dissolved salt selected from the group consisting of $Li_2B_{10}H_{10}$, $Na_2B_{10}H_{10}$, $K_2B_{10}H_{10}$, $(NH_4)_2B_{10}H_{10}$, $Li_2B_{12}H_{12}$, $Na_2B_{12}H_{12}$, $K_2B_{12}H_{12}$, $(NH_4)_2B_{12}H_{12}$, and combinations thereof.

In a fifteenth embodiment, the present disclosure provides the method or storage pool of the fourteenth embodiment, wherein the $Li_2B_{10}H_{10}$ or $Li_2B_{12}H_{12}$ is enriched in $^7$Li.

In a sixteenth embodiment, the present disclosure provides the method or storage pool of the twelfth embodiment, wherein the polyhedral boron hydride anions comprise $B_{11}H_{14}^{-}$, wherein the polyhedral boron hydride anions are from a dissolved salt selected from the group consisting of $LiBi_{11}H_{14}$, $NaB_{11}H_{14}$, $KB_{11}H_{14}$, $(NH_4)B_{11}H_{14}$, and combinations thereof, and optionally wherein the $LiB_{11}H_{14}$ is enriched in $^7$Li.

In a seventeenth embodiment, the present disclosure provides the method or storage pool of any one of the first to eleventh embodiments, wherein the anions are carborane anions, wherein the carborane anions comprise $CB_{11}H_{12}^{-}$, wherein the carborane anions are from a dissolved salt selected from the group consisting of $LiCB_{11}H_{12}$, $NaCB_{11}H_{12}$, $KCB_{11}H_{12}$, $NH_4CB_{11}H_{12}$, and combinations thereof, and optionally wherein the $LiCB_{11}H_{12}$ is enriched in $^7$Li.

In an eighteenth embodiment, the present disclosure provides the method or storage pool of any one of the first to seventeenth embodiments, wherein the storage pool further comprises a rack on which the nuclear fuel rod or portion thereof is stored.

In a nineteenth embodiment, the present disclosure provides the method or storage pool of any one of the first to eighteenth embodiments, wherein the storage pool has at least 20 feet (6.1 meters) of the aqueous solution over the nuclear fuel rod or portion thereof.

In a twentieth embodiment, the present disclosure provides the method or storage pool of any one of the first to nineteenth embodiments, wherein the storage pool is located on a site that further comprises at least one of a light water reactor, a boiling water reactor, a pressure water reactor, a small modular reactor, or a heavy water reactor.

In a twenty-first embodiment, the present disclosure provides a method of servicing a nuclear reactor core, the method comprising receiving at least one used fuel rod from a nuclear reactor core into a storage pool comprising an aqueous solution comprising at least one of polyhedral boron hydride anions or carborane anions.

In a twenty-second embodiment, the present disclosure provides the method of the twenty-first embodiment, wherein the used nuclear fuel rod is a spent fuel rod.

In a twenty-third embodiment, the present disclosure provides the method of the twenty-first or twenty-second embodiment, further comprising receiving at least one fresh nuclear fuel rod into the storage pool.

In a twenty-fourth embodiment, the present disclosure provides the method of any one of the twenty-first to twenty-third embodiments, wherein the storage pool further comprises a rack onto which the at least one used nuclear fuel rod is placed.

In a twenty-fifth embodiment, the present disclosure provides the method of any one of the twenty-first to twenty-fourth embodiments, wherein the storage pool has at least 20 feet (6.1 meters) of the aqueous solution over the at least one used nuclear fuel rod.

In a twenty-sixth embodiment, the present disclosure provides the method of any one of the twenty-first to twenty-fifth embodiments, wherein the nuclear reactor core is a component of a light water reactor, a boiling water reactor, a pressure water reactor, a small modular reactor, or a heavy water reactor.

In a twenty-seventh embodiment, the present disclosure provides the method of any one of the twenty-first to twenty-sixth embodiments, wherein servicing the nuclear reactor core comprises refueling the nuclear reactor core.

In a twenty-eighth embodiment, the present disclosure provides the method of any one of the twenty-first to twenty-sixth embodiments, wherein servicing the nuclear reactor core comprises shutting down the nuclear reactor core.

In a twenty-ninth embodiment, the present disclosure provides the method of any one of the twenty-first to twenty-eighth embodiments, wherein the at least one of polyhedral boron hydride anions or carborane anions are enriched in $^{10}$B.

In a thirtieth embodiment, the present disclosure provides the method of any one of the twenty-first to twenty-ninth embodiments, wherein the at least one of polyhedral boron hydride anions or carborane anions are provided by a dissolved Group I salt or ammonium salt.

In a thirty-first embodiment, the present disclosure provides the method of the thirtieth embodiment, wherein the Group I salt or ammonium salt has at least 25 percent by weight boron.

In a thirty-second embodiment, the present disclosure provides the method of the thirtieth or thirty-first embodiment, wherein the Group I salt or ammonium salt has a water solubility of at least 15 grams per 100 grams of solution at 20° C.

In a thirty-third embodiment, the present disclosure provides the method of any one of the twenty-first to thirty-second embodiments, wherein the anions are polyhedral boron hydride anions comprising at least one of $B_{10}H_{10}^{2-}$, $B_{11}H_{14}^-$, or $B_{12}H_{12}^-$.

In a thirty-fourth embodiment, the present disclosure provides the method of the thirty-third embodiment, wherein the polyhedral boron hydride anions comprise at least one of $B_{10}H_{10}^{2-}$ or $B_{12}H_{12}^{2-}$.

In a thirty-fifth embodiment, the present disclosure provides the method of the thirty-fourth embodiment, wherein the polyhedral boron hydride anions are from a dissolved salt selected from the group consisting of $Li_2B_{10}H_{10}$, $Na_2B_{10}H_{10}$, $K_2B_{10}H_{10}$, $(NH_4)_2B_{10}H_{10}$, $Li_2B_{12}H_{12}$, $Na_2B_{12}H_{12}$, $K_2B_{12}H_{12}$, $(NH_4)_2B_{12}H_{12}$, and combinations thereof.

In a thirty-sixth embodiment, the present disclosure provides the method of the thirty-fifth embodiment, wherein the $Li_2B_{10}H_{10}$ or $Li_2B_{12}H_{12}$ is enriched in $^7Li$.

In a thirty-ninth embodiment, the present disclosure provides the method of the thirty-third embodiment, wherein the polyhedral boron hydride anions comprise $B_{11}H_{14}^-$, wherein the polyhedral boron hydride anions are from a dissolved salt selected from the group consisting of $LiB_{11}H_{14}$, $NaB_{11}H_{14}$, $KB_{11}H_{14}$, $(NH_4)B_{11}H_{14}$, and combinations thereof, and optionally wherein the $LiB_{11}H_{14}$ is enriched in $^7Li$.

In a thirty-eighth embodiment, the present disclosure provides the method of any one of the twenty-first to thirty-second embodiments, wherein the anions are carborane anions, wherein the carborane anions comprise $CB_{11}H_{12}^-$, wherein the carborane anions are from a dissolved salt selected from the group consisting of $LiCB_{11}H_{12}$, $NaCB_{11}H_{12}$, $KCB_{11}H_{12}$, $NH_4CB_{11}H_{12}$, and combinations thereof, and optionally wherein the $LiCB_{11}H_{12}$ is enriched in $^7Li$.

The following specific, but non-limiting, examples will serve to illustrate the present disclosure.

EXAMPLES

The salts in the Table, below, can be useful in the method and storage pool according to the present disclosure in any of the above embodiments.

Salt solubilities indicated in the Table, below, were determined by the following procedure. A known quantity of water (either 25 grams or 50 grams) was added to a 2-necked round bottomed flask with thermometer and stir bar on a magnetic stir plate. The solute (salt) was analytically weighed and added to the solvent in approximately 0.1-g increments while measuring the temperature of the solution. Solute was added until turbidity was observed in the solution after addition and agitation. Solubility in grams per 100 grams solution was then calculated and provided the Table, below. The temperature range measured was 18° C. to 21° C.

TABLE

| Salt solubilities in grams per 100 grams of solution | | | | | |
|---|---|---|---|---|---|
| | Li | Na | K | Cs | $(C_2H_5)_3NH$ |
| $B_{12}H_{12}^{2-}$ salts | 54.7 | 50.4 | 40.7 | 2.3 | 1.6 |
| $B_{10}H_{10}^{2-}$ salts | 58.4 | 56.9 | 38.0 | 4.2 | 15.7 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method of storing nuclear fuel outside of a nuclear reactor core, the method comprising at least one of:
submerging at least a portion of a nuclear fuel rod in a storage pool comprising an aqueous solution comprising polyhedral boron hydride anions dissolved in the aqueous solution,
wherein the aqueous solution with the anions dissolved therein is free of organic polymers; or
adding a salt comprising a polyhedral boron hydride anion to a storage pool comprising water and at least a portion of a nuclear fuel rod submerged therein, wherein adding the salt provides an aqueous solution comprising polyhedral boron hydride anions dissolved in the aqueous solution,
wherein the aqueous solution with the anions dissolved therein is free of organic polymers.

2. The method of claim 1, wherein the nuclear fuel rod or the portion thereof is a spent fuel rod or a portion thereof or a used fuel rod or a portion thereof.

3. The method of claim 1, wherein the nuclear fuel rod or the portion thereof is a fresh fuel rod or a portion thereof.

4. The method of claim 1, wherein the nuclear fuel rod or portion thereof is a used fuel rod, the method further comprising receiving the used fuel rod from the nuclear reactor core into the storage pool comprising the aqueous solution comprising the polyhedral boron hydride anions dissolved in the aqueous solution.

5. The method of claim 1, wherein the storage pool has at least 20 feet (6.1 meters) of the aqueous solution over the nuclear fuel rod or portion thereof.

6. The method of claim 1, wherein the storage pool further comprises a rack on which the nuclear fuel rod or portion thereof is placed.

7. The method of claim 1, wherein the polyhedral boron hydride anions are enriched in $^{10}B$.

8. The method of claim 1, wherein the polyhedral boron hydride anions carborane anions comprise at least one of $B_{10}H_{10}^{2-}$, or $B_{12}H_{12}^{2-}$.

9. The method of claim 1, wherein the polyhedral boron hydride anions comprise at least one of $B_{10}H_{10}^{2-}$ or $B_{12}H_{12}^{2-}$.

10. The method of claim 1, further comprising dissolving a salt selected from the group consisting of $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_{14}$, $(NH_4)B_{11}H_{14}$, $Li_2B_{12}H_{12}$, $Na_2B_{12}H_{12}$, $K_2B_{12}H_{12}$, $(NH_4)_2B_{12}H_{12}$, and combinations thereof in water to provide the aqueous solution.

11. The method of claim 1, further comprising dissolving a Group I salt or ammonium salt comprising the polyhedral boron hydride anions in water to provide the aqueous solution.

12. The method of claim 11, wherein the Group I salt or ammonium salt has at least 25 percent by weight boron.

13. The method of claim 1, further comprising dissolving a salt having a water solubility of at least 15 grams per 100 grams of solution at 20° C. in water to provide the aqueous solution comprising the polyhedral boron hydride anions dissolved in the aqueous solution.

14. A storage pool comprising:
an aqueous solution comprising polyhedral boron hydride anions dissolved in the aqueous solution,
wherein the aqueous solution with the anions dissolved therein is free of organic polymers; and
at least a portion of a nuclear fuel rod submerged in the aqueous solution, wherein the nuclear fuel rod is outside of a nuclear reactor core.

15. The storage pool of claim 14, wherein the polyhedral boron hydride anions comprise at least one of $B_{10}H_{10}^{2-}$, $B_{11}H_{14}^{-}$, or $B_{12}H_{12}^{2-}$.

16. The storage pool of claim 14, wherein the polyhedral boron hydride anions comprise at least one of $B_{10}H_{10}^{2-}$ or $B_{12}H_{12}^{2-}$.

17. The storage pool of claim 14, wherein the aqueous solution comprises a salt selected from the group consisting of $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_{14}$, $(NH_4)B_{11}H_{14}$, $Li_2B_{12}H_{12}$, $Na_2B_{12}H_{12}$, $K_2B_{12}H_{12}$, $(NH_4)_2B_{12}H_{12}$, and combinations thereof dissolved in the aqueous solution.

18. The storage pool of claim 14, wherein the aqueous solution comprises a Group I salt or ammonium salt comprising the polyhedral boron hydride anions dissolved in the aqueous solution.

19. The storage pool of claim 18, wherein the Group I salt or ammonium salt has at least 25 percent by weight boron.

20. A method of storing nuclear fuel outside of a nuclear reactor core, the method comprising at least one of:
submerging at least a portion of a nuclear fuel rod in a storage pool comprising an aqueous solution comprising polyhedral boron hydride anions dissolved in the aqueous solution,
wherein the aqueous solution with the anions dissolved therein is free of organic polymers; or
adding a salt comprising a polyhedral boron hydride anion to a storage pool comprising water and at least a portion of a nuclear fuel rod submerged therein,
wherein adding the salt provides an aqueous solution comprising polyhedral boron hydride anions dissolved in the aqueous solution,
wherein the aqueous solution with the anions dissolved therein is free of organic polymers,
wherein the polyhedral boron hydride anions have a cage structure.

* * * * *

UNITED STATES PATENT AND TRADEMARK OFFICE
CERTIFICATE OF CORRECTION

PATENT NO. : 10,886,032 B2  
APPLICATION NO. : 15/306324  
DATED : January 5, 2021  
INVENTOR(S) : Kevin Cook Page 1 of 1

It is certified that error appears in the above-identified patent and that said Letters Patent is hereby corrected as shown below:

In the Specification

Column 4  
Line 16, delete "$B_{12}H_{12}^-$," and insert -- $B_{12}H_{12}^{2-}$, --, therefor.

Column 11  
Line 11, delete "$B_{12}H_{12}^-$." and insert -- $B_{12}H_{12}^{2-}$. --, therefor.

In the Claims

Column 12  
Line 53, Claim 8, delete "hydride anions carborane anions" and insert -- hydride anions --, therefor.  
Line 54, Claim 8, delete "or $B_{12}H_{12}^{2-}$." and insert -- $B_{11}H_{14}^-$, or $B_{12}H_{12}^{2-}$. --, therefor.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*